United States Patent
Gray et al.

(10) Patent No.: US 7,469,236 B2
(45) Date of Patent: Dec. 23, 2008

(54) FEATURE INTERACTION RESOLUTION USING FUZZY RULES

(75) Inventors: Tom Gray, Carp (CA); Ahmed Karmouch, Gloucester (CA); Magdi Ahmer, Ottawa (CA); Serge Mankovskii, Carp (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 257 days.

(21) Appl. No.: 11/157,573

(22) Filed: Jun. 21, 2005

(65) Prior Publication Data

US 2005/0240547 A1    Oct. 27, 2005

Related U.S. Application Data

(63) Continuation of application No. 10/442,571, filed on May 21, 2003, now Pat. No. 6,915,285, which is a continuation of application No. 09/613,537, filed on Jul. 10, 2000, now Pat. No. 6,606,610.

(30) Foreign Application Priority Data

Jul. 9, 1999    (GB)    .................... 9916234.9

(51) Int. Cl.
G06F 15/18    (2006.01)
(52) U.S. Cl. .................... 706/14; 706/12; 706/46; 706/52
(58) Field of Classification Search ............ 706/14, 706/12, 46, 52
See application file for complete search history.

(56) References Cited

U.S. PATENT DOCUMENTS

| | | | |
|---|---|---|---|
| 6,049,819 A * | 4/2000 | Buckle et al. ............ 709/202 |
| 6,356,936 B1 * | 3/2002 | Donoho et al. ............ 709/206 |
| 6,536,935 B2 * | 3/2003 | Parunak et al. ............ 700/99 |
| 6,801,929 B1 * | 10/2004 | Donoho et al. ............ 709/204 |
| 6,931,434 B1 * | 8/2005 | Donoho et al. ............ 709/207 |
| 6,983,227 B1 * | 1/2006 | Thalhammer-Reyero ....... 703/2 |
| 6,983,266 B1 * | 1/2006 | Goldschmidt ............ 706/52 |
| 2003/0084052 A1 * | 5/2003 | Peterson ............ 707/100 |

FOREIGN PATENT DOCUMENTS

| | | |
|---|---|---|
| EP | 0825 787 | 2/1998 |
| GB | 2299730 | 10/1996 |
| WO | WO 98/07282 | 2/1998 |

OTHER PUBLICATIONS

Yoichiro Maeda, Behavior Learning and Group evolution for Autonomous Multi-Agent Robot, 1997, IEEE, 0-7803-3796-4/97, 13551360.*

(Continued)

*Primary Examiner*—Joseph P Hirl

(57) ABSTRACT

A method of detecting feature interaction conflicts between agents in response to events in a multi-agent system comprises posting said events as tuples and event requests as anti-tuples from said agents in said multi-agent system, receiving said events and said event requests in a tuple space, generating responses to each of said agents for said events which match said event requests of said agents, wherein feature interaction conflict is detected when more than one of said agents are to exert control over an event.

3 Claims, 6 Drawing Sheets

OTHER PUBLICATIONS

Various, You fuzzin' with me?, 1996, Imperial College of Science, Technology and Medicine, 1-5.*

Lotfi A. Zadeh, Knowledge Representation in Fuzzy Logic, 1989, IEEE, 89-100.*

James Bowen, Conflict Resolution in Fuzzy Forward Chaining Production Systems, 1988, Proc. of AAI-88, 117-121.*

Cunningham, H. Conrad, "Swarming Over the Software Barrier", 1991, IEEE, Th0388-9/91/0000/0233, pp. 233-236.

Gelernter, David, "Generative Communication in Linda", Jan. 1985, ACM vol. 7, No. 1, pp. 80-112.

Hansen, Randy et al., "An Efficient Fault-Tolerant Tuple Space", May 1995, IEEE, 0-8186, pp. 220-225.

Joung, Yuh-Jzer, "A Comprehensive Study of the Complexity of Multiparty Interaction", Jan. 1996, ACM, 0004-5411, pp. 75-115.

Aho et al., "Feature Interactions in the Global Information Infrastructure" (Panel Session Introductions), 3 pages.

Buhr et al., "Feature Interaction visualization and Resolution in an Agent Environment", Feature Interactions in Telecommunications and Software Systems, pp. 135-149, 1998.

Cameron et al., "A Feature Interaction Benchmark for IN and Beyond" Feature Interactions in Telecommunications and Sofware Systems, pp. 1-23, 1994.

Franklin et al., "Is it an Agent, or just a Program?: A Taxonomy for Autonomous Agents", Proceedings of the Third International Workshop on Agent Theories, Architectures and Languages, Springer-Verlag, 1996. pp. 1-10.

Griffeth et al., "The Negotiating Agents Approach to Runtime Feature Interaction Resolution", Feature Interactions in Telecommunications and Software Systems, 1994. pp. 217-235.

Marriott, Damian, "Policy Service for Distributed Systems", Jun. 1997. pp. 1-131.

Nwana, Hyacinth, "Software Agents: An Overview", Knowledge Engineering Review, vol. 11, No. 3, Sep. 1996. 57 pages.

Ohta et al., "Classification, Detection and Resolution of Service Interactions in Telecommunication Services", Feature Interactions in Telecommunications and Software Systems, 1994. pp. 60-72.

Wooldridge et al., "Intelligent Agents: Theory and Practice", Submitted to Knowledge Engineering Review, Oct. 1994. Revised Jan. 1995. pp. 1-62.

Zave, Pamela, "Architectural Solutions to Feature-Interaction Problems in Telecommunication", Feature Interactions in Telecommunications and Software Systems, 1998. pp. 10-22.

* cited by examiner

Figure 3a

**Rule Strengths of Selected Rules for
the Sprinkler Control System**

Air Temperature = 92° F, Soil Moisture =11%

|  | Rule Strengths |
|---|---|
| "If temperature is hot (46) AND soil is dry (25), then water duration is long" | .25 |
| "If temperature is warm (2) AND soil is moist (75), then water duration is medium" | .2 |
| "If temperature is warm (2) AND soil is dry (25), then water duration is long" | .2 |
| "If temperature is hot (46) AND soil is moist (75), then water duration is medium" | .46 |

Figure 3b
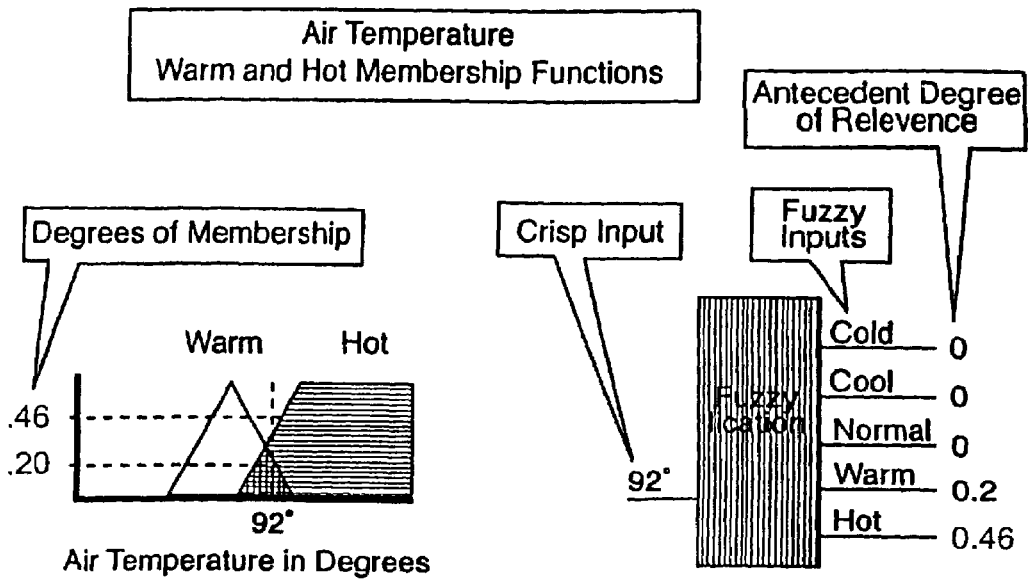
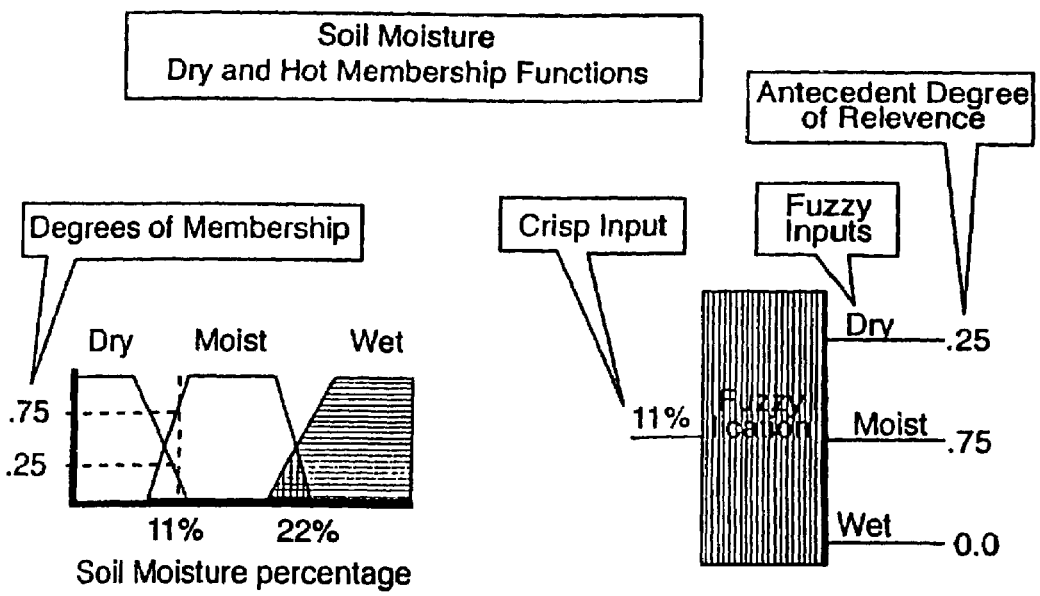

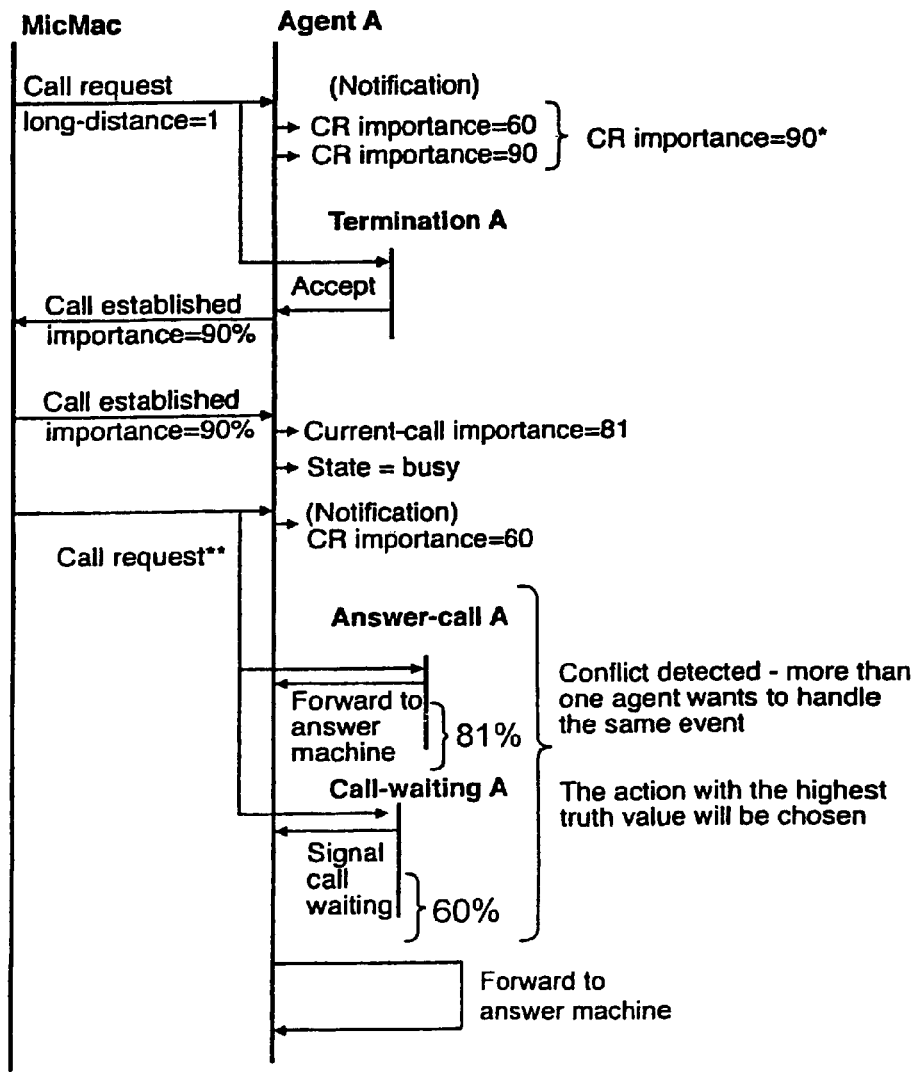

FEATURE INTERACTION RESOLUTION USING FUZZY RULES

This Application is a continuation of application Ser. No. 10/442,571, entitled "Feature Interaction Resolution Using Fuzzy Rules" and filed on May 21, 2003, now U.S. Pat. No. 6,915,285, which is a continuation of application Ser. No. 09/613,537, entitled "Feature Interaction Resolution Using Fuzzy Rules" and filed on Jul. 10, 2000, now U.S. Pat. No. 6,606,610. The entire disclosures of application Ser. No. 09/613,537 and 10/442,571 are incorporated herein by reference.

FIELD OF THE INVENTION

This invention relates in general to communications systems, and more particularly to a method of resolving conflicts between multiple agents in an open standards-based communications system.

BACKGROUND OF THE INVENTION

The evolution towards the design of multimedia communications systems based on open standards has been ongoing since the 1980's. One example of such a system is the MediaPath™ communications server manufactured by Mitel Corporation. The MediaPath™ system comprises call control software which operates in conjunction with a plurality of server telecommunication boards (voice processing board, trunk board, line board, etc.).

In R. Buhr, D. Amyot, M. Elammari, D. Quesnel, T. Gray, S. Mankovski, "Feature-Interaction Visualisation and Resolution in an Agent Environment", edited by K. Kimbler and L. G. Bouma, p.135-149, a multi-agent architecture is set forth wherein each physical device is represented by a device agent that is responsible for handling and controlling all requests and actions of the device. The device agent may contain multiple feature agents, which are responsible for implementing the various features to which the device has subscribed. The end user may also be represented by a user-agent, which contains all of the preferences of the user.

Feature interaction occurs when two or more agents want to apply different policies whose actions or goals conflict. Detecting and resolving feature interactions has been an active area of research (see for example L. G. Bouma, H. Velthuijsen, editors: "Feature Interactions in Telecommunications Systems", ISO Press, Amsterdam, 1994, 272 pp.; K. E. Cheng, T. Ohta, editors: "Feature Interactions in Telecommunications III", ISO Press, Amsterdam, 1995, 223 pp.; P. Dini, R. Boutaba, L. Logrippo, editors: "Feature Interactions in Telecommunications Networks IV", ISO Press, Amsterdam, 1997, 373 pp.; and K. Kimbler and L. G. Bouma, "Feature Interactions in Telecommunications and Software Systems V", ISO Press, Amsterdam, 1998, 374 pp.). Several approaches to solving the problem of feature interaction are also set forth in A. Aho, N. Griffeth, "Feature Interactions in the Global Information Infrastructure," in Foundations of Software Engineering, Washington, October 1995.

One common aspect to all of the prior art solutions to the problem of feature interaction is that the end user has no control of the outcome of the feature interactions. The systems according to the prior art predefine the result of feature interactions, without taking into consideration the parameters that are relevant to the end user, such as, the source of the call or the time of day. For example, the system disclosed in R. Buhr, et al uses an absolute priority mechanism to resolve conflict between multiple agents. In that system, a PROHIBIT action always take precedence over a FORWARDTO or a PERMIT action, with the result that the end user cannot affect the result of a feature interaction.

SUMMARY OF THE INVENTION

According to the present invention, an architecture of multiple agents is provided, based on the negotiating agents' approach to resolving feature interactions, as set forth in R. Buhr, et al, discussed above and N. Griffeth, H. Velthuijsen, "The Negotiating Agents Approach to Runtime Feature Interaction Resolution", in *Feature Interactions in Telecommunications Systems*, IOS Press, Amsterdam, May 1994. However, according to the present invention, an event-based model is used to detect feature interaction, and fuzzy constraints are applied to the policies that describe the system. A mechanism is established by which the user may add rules or provide the system with parameters that will affect the outcome of any conflict that may occur, thereby giving real control over the conflict to the end user.

BRIEF DESCRIPTION OF THE DRAWINGS

A detailed description of a preferred embodiment of the present invention is provided herein below with reference to the following drawings, in which:

FIGS. 3*a* and 3*b* provide a depiction of an exemplary fuzzy rule-based control system for showing the principle of fuzzy rules;

FIG. 4 is message diagram showing a first application of fuzzy rules to arbitration between multiple feature agents according to the present invention.

DETAILED DESCRIPTION OF THE PREFERRED EMBODIMENT

Figure 1:
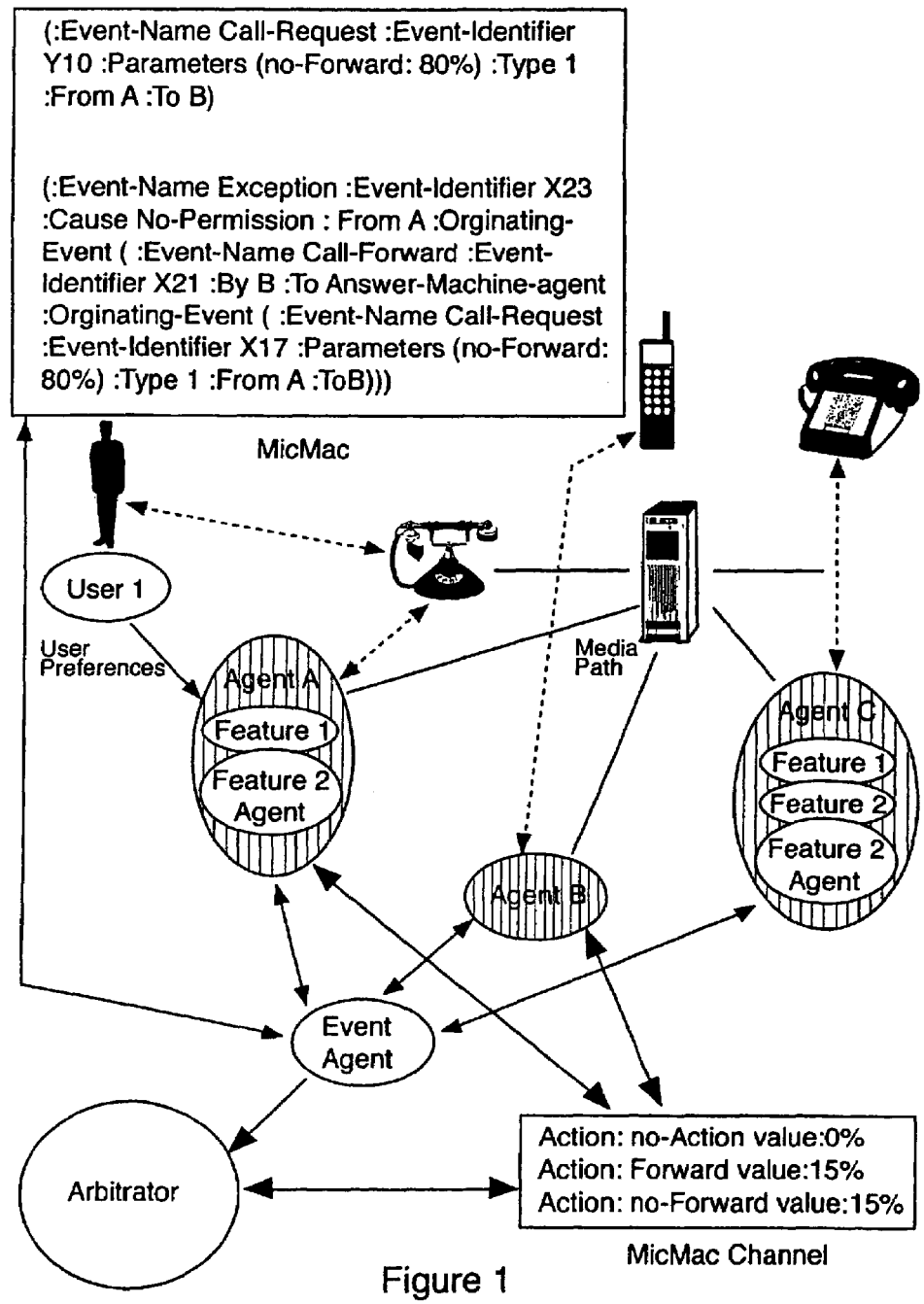
FIG. 1 is a schematic representation of a multi-agent communication system in accordance with the present invention.

With reference to FIG. 1, a multi-agent communication system is shown comprising a MediaPath™ server for controlling calls between users at various telephone devices, and a MicMac™ tuple space (see, for example, D. Gelernter, "Generative Communication in Linda" in *ACM Transaction on Programming Languages and Systems*, Vol. 7, No 1, pp. 80-112) for communicating between multiple agents, as discussed in http://micmac.mitel.com/. Thus, a first user is represented by a user agent (User 1) which issues preferences defined by that user, a POTS (plain old telephone set) is represented by a device agent (Agent A), a mobile telephone is represented by another device agent (Agent B), and a digital phone is represented by a further device agent (Agent C). The physical devices are connected to the MediaPath server which implements the agent communication architecture via a publish-subscribe mechanism using the MicMac tuple space. Thus, an Event Agent communicates with each of the Agents A, B and C for invoking operations using tuples (a set of ordered pairs called ingles). Each ingle consists of a type (e.g. From) and a value (e.g. A). Thus, an exemplary tuple would be: {: From A:To B:callId id}. This tuple describes a call request from A to B. The tuple space enables coordination by allowing queries based on the matching of tuples by anti-tuples. An anti-tuple is a tuple that can be used as a query in the tuple space. In form, it is identical to a tuple except that the value of any or all fields may be replaced by a '?', which indicates a 'don't care' condition, similar to a template. Tuple spaces are set up to match tuples with anti-tuples which agree in all fields except for the ones indicated by the '?' query, similarly to Prolog unification. Four operations on the tuple space have been defined; poke, peek, pick and cancel. Poke places a tuple in the tuple space. Peek queries the tuple space with an anti-tuple (matching tuples will remain in the tuple space). Pick also queries the tuple space with an anti-tuple (but matching tuples will be removed from the tuple space). Cancel removes all matching anti-tuples from the tuple space. A lifetime for tuples can also be defined.

According to the preferred embodiment of the invention, a policy notation is adopted as set forth in D. Marriott, "*Policy Service for Distributed Systems*", Master's thesis, Imperial College of Science Technology and Medicine, London, UK, 1997, p. 131. The general format of this notation is given below, with optional arguments written within brackets.

Policy_ID mode[trigger]subject(s){actions} target(s)[when constraint(s)]

The Policy_ID is an identifier that uniquely identifies the policy within the system. The mode of a policy can have one of the following values: A+ is used to represent positive authorization mode, which represents the permitted actions; A– is used to represent negative authorization mode, which represents the forbidden actions; O+ is used to represent positive obligation mode, which represent the actions that the agent must perform: and O– is used to represent negative obligation mode, which represents the actions that the agent must prevent from occurring. Triggers are used only with obligation (positive or negative). They specify the events the agents should react to.

Subject(s) are the agent(s) that are responsible for carrying out the actions described in the policy.

Target(s) are the objects that will be affected by the actions.

Constraints are the pre-conditions that must be realized for the policy to be applicable. Constraints can place conditions on the subject, target or mode of the policy or on the state of the system.

As shown in FIG. 1, the system of the present invention is an event-based model to detect feature interactions. An event represents the occurrence of an action, for example, On-Arrival, Call-Request, On-Exception, At-Time=X. These events represent user actions, system actions or agent requests.

Event-based systems are composed of three major components, an Event Blackboard, an Event Agent and an Arbitrator. Events are posted on the event blackboard, which is implemented by Micmac, as shown in FIG. 1. Each agent registers for all of the events it is interested in with the Event Agent. Two levels of registration exist: notification and handling. An agent may want to be notified of the occurrence of an action in order to change its internal state or to start a set of actions. One example is a cost agent, which is responsible for calculating the cost of using a service, which wants to be notified when a call is established to start calculating the resulting cost. The second level of registration is handling. In this case, the agent wants to have a monopoly over control of an event. One example is when a call request to a specific device is made. A termination-call-screening agent wants to be allowed to refuse the call if the caller is on its screening list, and it wants to prevent any other agent from trying to process the call. It must be notified that in this case, the termination-call-screening agent does not oppose notification of another agent of this call attempt.

A conflict occurs when two or more agents want to handle the same event. Conflicts can occur on two levels, either between several device-agents, or inside a single agent (between two or more feature-agents). According to the present invention, conflict is first resolved at the agent level, so that an agent only proposes a single action in response to an event. Each agent is free to choose the method used for solving the conflict at the agent level. In the preferred implementation, fuzzy logic is used, as discussed in greater detail below.

Conflict between multiple agents is resolved via a special purpose agent, commonly referred to as an arbitrator. Arbitrators can be either passive or active. A passive arbitrator does not control the conflict, but rather only detects the occurrence of a conflict and opens a separate channel for the conflicting agents to negotiate and to come up with a suggestion for all of the conflicting agents to agree on. The suggested action is posted on the Event Blackboard as a request made by all of the agents that participate in the conflict resolution. On the other hand, an active arbitrator takes all the proposed actions of the conflicting agents and, using some heuristic, chooses one of these actions. Usually, the active arbitrator is used when a priority mechanism can be defined. According to the present invention, a passive arbitrator is utilized, and the negotiation between agents involves the use of fuzzy logic.

Conflict can also occur if an agent wants to perform an action on another agent without having the permission to perform such an action. In this case, the two agents enter a negotiation phase, trying to reach an agreement, which may involve one agent paying a certain cost to the other agent in order to allow the action. If no agreement is reached at the end, an Exception event is generated and posted on the Event Blackboard.

When an event occurs, all of the agents that have been registered for the event are informed. If all of the preconditions that are associated with that event are realized, the agent will suggest an action. If not, the agent will reply with "No Action". The arbitrator waits until it receives a reply from all of the agents registered to handle the event. If more than one agent replies to the event, the arbitrator detects the conflict and intervenes so that only one action is chosen. If no agent is registered to handle an event, or if all of the agents reply by a "No Action", the event is automatically removed and the arbitrator agent is notified (to accommodate the possibility of the occurrence of a state that was not taken into consideration during the design of the system).

Figure 2:
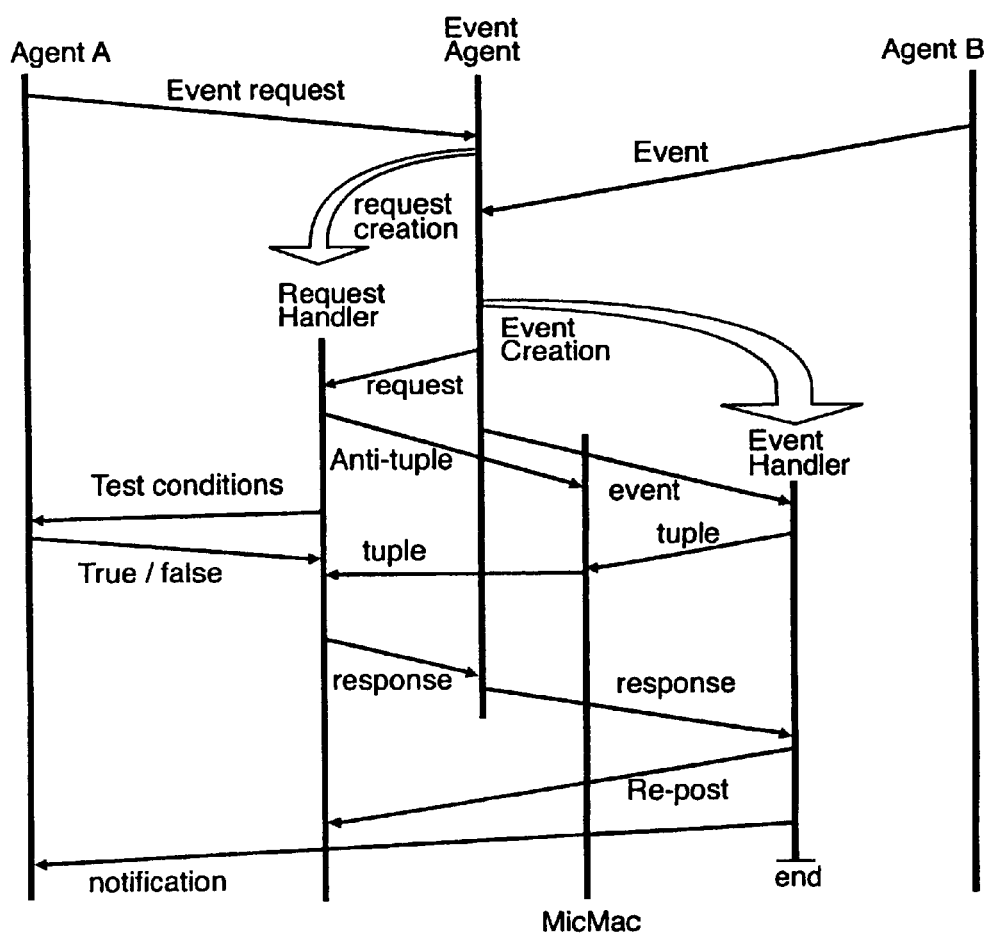
FIG. 2 is a message diagram for illustrating event request registration, event posting and conflict detection in a multi-agent system according to the present invention.

The Event Agent is responsible for handling event registration, event posting and conflict detection, as shown in FIG. 2.

When the event agent receives an event request from Agent A, the event agent creates a new instance of the RequestHandler class, and generates a unique key called requestHandlerIdentifier. The event agent adds the generated object to a Hashtable, called RequestHandlerPool, in which the agent keeps a reference to all of the generated requestHandlers, with the requestHandlerIdentifier as a key.

The RequestHandler object is responsible for handling individual event requests. Thus, if Agent A wants to be notified when a Call-Request is sent to it, the RequestHandler object will post the following peek anti-tuple on MicMac.

EventName: CallRequest {the name of the event}.

EventIdentifier: any {a unique identifier for the event}

Parameters: any {a tuple containing a list of additional parameters}.

Type: (zero or 1) {depending on the registration level (notification or handling)}.
From: any {the sender of the call request}
To: A {the receiver of the call request}

The Parameters ingle, which is an inner-tuple (i.e. an ingle whose value is a complete tuple), contains a list of optional parameters that can be associated with the event. A parameter that is not in the list of parameters is interpreted as having a value of zero. In fact, the event request may involve some conditions involving logical operations and parameters relevant to the current state of the requesting agent or the system state. An agent, for example, may be interested only in a call request if the call importance is greater than 50%. In this case, the RequestHandler object registers for the events as described above, with the parameters value "any".

If a tuple is retrieved, as discussed below with reference to event posting, the RequestHandler object sends the tuple to the agent that owns the RequestHandler object (Agent A in FIG. 2). The latter tests all conditions of the rule and returns a boolean value (i.e. true/false), referred to as a result, that indicates whether all of the preconditions were satisfied or not. The RequestHandler object then sends a response to the event agent, as discussed below.

When the event agent receives an event (e.g. from Agent B in FIG. 2), the event agent creates a new instance of the EventHandler class, and generates a unique key referred to herein as EventIdentifier. The event agent adds the generated object to a Hashtable, called EventPool, in which the agent keeps a reference to all of the generated EventHandlers, with the EventIdentifier as a key.

Thus, if Agent B wants to post a call request to Agent A, the EventHandler object posts the following tuple on MicMac.
EventName: CallRequest {the name of the event}.
EventIdentifier: EventIdentifier
Parameters: any {or the tuple of parameters if any}.
Type: any.
From: B {the sender of the call request}
From: A {the receiver of the call request}

The EventHandler object then waits for a given duration to receive all of the forwarded responses of the RequestHandler objects, as discussed above. The parameters of these responses are locally stored in a Vector which, as discussed above, is called responses.

After this duration, the EventHandler object removes the tuple from MicMac (using a pick anti-tuple). Then, the EventHandler object issues a re-post request for each of the RequestHandler objects stored in responses, so that they re-post their anti-tuples again to wait for new events.

If no response is received, the event is registered in a log file to indicate the occurrence of a non-handled event with all of the corresponding parameters, as discussed above.

An event notification will be sent to all the requesting agents whose request type is notification. If only one RequestHandler object wants to handle the event, an event notification is sent to the requesting agent (Agent B). If more than one RequestHandler object wants to handle the event, the EventHandler object informs the event agent which, in response, invokes the arbitrator object, as discussed in greater detail below.

As discussed briefly above, fuzzy constraints are applied to the policies that describe the system according to the present invention. Before discussing the application of fuzzy rules to the system of the present invention, a brief introduction to fuzzy logic is presented herein below.

Much of human reasoning involves the use of linguistic variables, that is, variables whose values are words rather than numbers (e.g. the "temperature" is "hot"). Thus, human perception of an ambient temperature of 80° F. may be rather hot, but it is also considered to be warm to some degree. Thus, the fact "temperature is hot" has a degree of truth (or degree of membership) that is partially true and partially false at the same time. Classic logic is too rigid to be able to express this concept, as it assigns only a value of true or false to the predicate "hot". Fuzzy logic is the branch of mathematics that is concerned with modeling information based on membership grades (see E. Cox, "*The Fuzzy Logic Systems Handbook*", AP Professional, Cambridge, 1994, p.624, and Motorola Corporation, "*Fuzzy Logic Education program*", The Centre for Emerging Computer Technologies, Motorola Inc., 1992).

The first step in fuzzy logic processing is to transform crisp inputs to fuzzy inputs. The rules are than evaluated and the fuzzy output is transferred back to a crisp output. In the system of the present invention, real-world modeling is accomplished through the use of fuzzy variables and sets of rules. In order to decide which rule to apply when modeling a system, the value of the fuzzy input variables must first be determined. Then, the strength of each rule is calculated by giving it the smallest strength value of the fuzzy inputs of its antecedents. The strength of the rule expresses how suitable the action suggested by the rule is to handle a given situation. The action that is suggested by the rule having the highest rule strength is considered the best alternative and thus is chosen by the system.

FIGS. 3a and 3b shows an example taken from the Motorola reference cited above. In this example, the duration of a sprinkler control system is determined using fuzzy rules. The first step involves transforming the input from crisp to fuzzy inputs (fuzzification). A temperature of 92 degrees F. is interpreted, using the Warm and Hot Membership function of FIG. 3b, as being 20% warm and 46% hot. A soil-moisture of 11% is considered as 25% dry and 75% moist. These values of these input variables are used in the fuzzy rules, and the strength of each rule is deduced. The rules suggest a long watering duration, with a truth-value of 25% (the highest suggested truth-value for a given fuzzy output value). It also suggests a normal duration with a truth-value of 46%. To determine the actual watering duration, the opposite process of fuzzification is applied to obtain the crisp value of the watering duration.

In the system according to the present invention, the defuzzification step is not used. Fuzzy logic is used only to determine which action is most suitable to handle a given situation, not to obtain a specific value for an output variable.

Fuzzy inputs are used in the present invention to allow the user to express concepts such as importance of a call, how busy a user is, or what time is more suitable for the user, as discussed in greater detail below.

In many cases, there is more than one acceptable outcome to a conflict between multiple agents. The end user may prefer one action to another, but one or more other actions may be acceptable to the user. Stated in terms of fuzzy logic, no rule is 100% acceptable (or true). Rules are only partially true. Thus, fuzzy logic constraints are used in the present invention to express these policies. The values of these constraints can be a parameter taken from the user-agent, which expresses the user preference. These constrains can also involve parameters from the event object, which are set by the requesting agent or the system itself. In the following portions of this disclosure, more detail is provided on how these parameters are set and used in accordance with the present invention.

As set forth in FIG. 1, each user is represented in the system by a user agent. This agent contains the preferences of the user, expressed using fuzzy variables. The user agent also contains information about the schedule of the user as well as constraints that the system imposes on this user. The user expresses his or her preferences by choosing values to fuzzy attributes like ForwardToSecretary, which expresses how much the user likes to be forwarded to the secretary of a person. The user can also add personalized rules like:

Pl_a1 O+ [on MeetingManager] agent {set(0.95)} agent.busyState

The foregoing rule indicates that when a manager meeting begins, the system should consider the user to be very busy. The busyState parameter is taken into consideration when searching for a suitable action, to prevent unnecessary interruption of the user. The reasoning mechanism is discussed in greater detail below with reference to FIGS. 4 and 5 through the use of examples.

Figure 5:
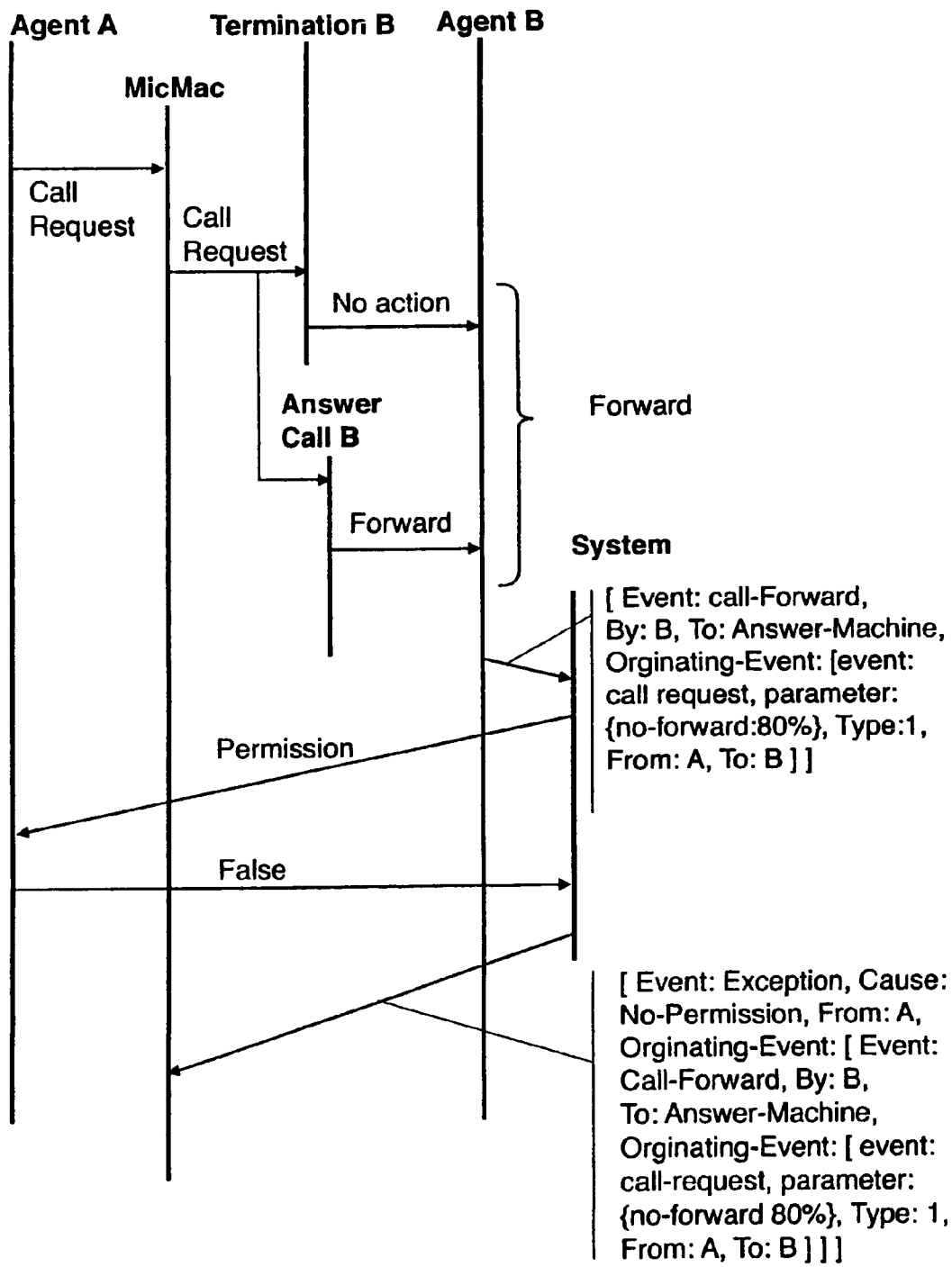
FIG. 5 is a message diagram showing a further application of fuzzy rules to conflict resolution between multiple agents system according to the present invention.

When a device is being used by a specific user, the user agent is contacted, and all of the rules that reflect the user preferences, as well as the fuzzy inputs, are added to the device-agent rules and parameters. For simplicity, the examples set forth below with reference to FIGS. 4 and 5 are shown after that the device agent has loaded the user's preferences.

As indicated above, events are modeled as objects with attributes. An event has a type, like Call-Request, On-Exception, which represents the class name of the event. An event object may have a number of variables such as an indication of the object(s) that generated the event, the time when the event was generated and the receiver of the event. An event can also have a variable number of associated fuzzy variables. An event such as Call-Request has a fuzzy variable called importance, which indicates the importance that the caller gives to a particular call. The receiving agent has also the right to modify this parameter to reflect the importance that the receiver of the call is giving to the caller. The event object may also contain parameters that express how the requesting agent would like his/her request to be treated. For example, the Call-Request event has an associated fuzzy parameter called no-Forward that indicate that the caller does not like his/her call to be forwarded to a third party. It should be noted that the system need not necessarily abide by a user's preferences.

The use of fuzzy logic in conflict resolution is hereinafter described in greater detail, by reference to specific example scenarios.

In the example of FIG. 4, fuzzy logic is used to arbitrate between two modules at the agent level. More particularly, an example is set forth of a conflict between Call Waiting (CW) and Answer Call (AC). CW generates a call-waiting tone to alert the called party, whereas AC connects the calling party to an answering service. If A is already on the line when the second call comes in, should A receive a call-waiting tone or should the second call be directed to the answering service? The previous example is classified as a Single-User-Single-Component (SUSC), as disclosed in J. Cameron, N. Griffeth, Y. Lin, M. Nilson, W. Schnure, H. Velthuijsen. "A Feature Interaction Benchmark for IN and Beyond". In L. G. Bouma, H. Velthuijsen, editors. "Feature Interactions in Telecommunications Systems", ISO Press, Amsterdam, 1994, p. 1-23, where the interactions occur because incompatible features are simultaneously in use by a single user in a single network component.

In this example, it is assumed that the user has expressed that he or she does not want to be interrupted during a long-distance telephone call. Thus, AC should take precedence over CW when the other call is a long distance call. Otherwise, CW should take precedence over AC.

The preferences of the user are modeled using the following rules.

Pl_a1 O+ [on CR:CallRequest] agent {set(0.6) }CR.importance

Pl_a2 O+ [on CR:CallRequest] agent {set(0.9) }CR.importance [when CR.isLongDistance]

Pl_a3 O+ [on CE:CallEstablishment] agent {set(0.9* CE.importance) }agent.currentCall.importance Rule Pl_a1 stipulates that when a call request is received, then the call importance (C.importance) is set to 0.6, while rule Pl_a2 stipulates that the importance of the call be set to 0.9 if the call is a long-distance call. The fuzzy parameters may be modified in the event of an intervening event affecting an agent, such as an event in which the call has begun. In this event, rule Pl_a3 stipulates that once the call has begun, the call importance is to be reduced to 90% its original value.

The Answer-Call agent contains the following rule.

Pl_ac1 O+ [on CR:CallRequest] AC {forwardToAnswerMachine( )} CR [when (agent.state=busy) AND (agent.currentCall.importance)]

This rule stipulates that the call should be forwarded to the answer machine if the user is currently using the telephone (thus the device agent state is busy) and that the current call is important. Note that importance is a fuzzy variable. Thus, the rule strength of this rule will be equal to the value of the importance of the current call.

The Call-Waiting agent contains the following rule.

Pl_cw1 O+ [on CR: CallRequest] CW {signal CallWaiting( )} agent [when (agent.state=busy) AND (CR.importance)]

This rule stipulates that the user should hear the call-waiting signal if he or she is currently on the telephone and the incoming call is important. Again, the rule strength of this rule will be equal to the value of the fuzzy variable C.importance, which indicates the importance of the incoming call.

Thus, in the situation of a long-distance call request being sent to this device agent. Initially, the call is given an importance of 90% (using rule Pl_a2). Once the call has been established, the importance of the call is set to 0.9*0.9=81% (using rule Pl_a3).

Now, in the event that another user tries to make a local call to this user, the importance of the call requested will be 60% (using rule Pl_a1). A conflict occurs between the AC and CW modules. The rule Pl_ac1 has the same strength as the importance of the current call, thus it will be equal to 0.81. On the other hand, the rule Pl_cw1 has the same strength as the incoming call, which is 0.6. In this case, Pl_ac1 will take precedence over Pl_cw1 and the incoming call will be directly forwarded to the answer machine.

If a request to establish another long-distance is sent to the agent while the user is still making the other long-distance, then the incoming call importance will be equal to 0.9. The rule strength of Pl_cw1 is 0.9, while Pl_ac1 strength will remain at 0.81. Pl_cw1 will take precedence over Pl_ac1 and the user will be provided with a call-waiting signal.

The foregoing example demonstrates the use of fuzzy logic in the system of the present invention. More specifically, this example illustrates how fuzzy logic constraints can be used to allow the user to alter the reaction of the system depending on the user's own preferences, thereby giving real call control to the end user.

In the example scenario depicted in FIG. 5, the use of fuzzy logic is demonstrated in accordance with the invention to resolve a conflict between multiple agents.

In this example user A wants to establish a conference call with users B and C. User A does not want any of the telephone calls placed to B and C to be forwarded to an answer machine or a secretary. Both B and C are not available. B has forwarded all telephone calls to her answer machine, while C has forwarded all telephone calls to his secretary. User C has left a report with his secretary that she should read to the others in the conference call.

Consider firstly the scenario of user A sending a Call-Request (CR) to user B. The device-agent of A posts the following Call-Request on the event-blackboard:

CR.caller=A, called=B, id=X1, noForward=80%

The id of the call request is set by the originating agent to identify this request if further processing is required. The no-Forward parameter is set by the caller to 80%, indicating that the originating agent prefers not to forward this call. For simplicity, assume also that the only entity that is interested in this call request is the called-agent B.

The device agent of B (Agent B) contains two sub-agents: a Termination-agent (B.T) and an Answer-Call-agent (B.AC).

Agent B also has an attribute, available, set to false, Agent B also contains the fuzzy variable forwardToVoiceMail parameter, which is set to 10%, indicating that persons who call her are permitted to be forwarded to her answer machine, but without forcing them to be so forwarded.

B.T contains the following policies:
Pl_BT1 O+ [on CR:CallRequest.called=B] B.T {accept-Call( )} CR [when (B.available=true)]
Pl_BT2 O+ [on CR:CallRequest.called=B] B.T {noAction( )} CR [when (B.available=false)]

B.AC contains the following policies:
Pl_BAC1 O+ [on CR:CallRequest.called=B] B.AC {noAction( )} CR [when (B.available=true)]
Pl_BAC2 O+ [on CR:CallRequest.called=B] B.AC {forwardCall( )} CR [when (B.available=false) AND (B.forwardToVoiceMail)]

The output of B.T is no-Action (no_action is always given a truth value of 0%), while B.AC chooses to forward the call to the answer machine, with a truth value of 10%, which is the value of the forward-To-Voice-Mail parameter. Agent B arbitrates between the output of the two modules and in response chooses forward-Call. Thus, the result of this event is a call forward on the call request.

The system then asks for the permission from the originator of the event (i.e. Agent A).

Agent A contains the following rule:
Pl_A1 A-A {forwardCall( )} CR:CallRequest[(CR.noForward)]

This rule indicates that A refuses to forward this call with a degree of truth of 80%, which is the value of the fuzzy input variable no-Forward. A No-Permission-Exception event is therefore generated. This event indicates the action that has been refused, the event that has generated this action, the agent(s) that suggested the action as well as the agent(s) that refused the action.

The arbitrator agent detects this exception opens a channel for the involved agents to start negotiating. All of the sub-agents that have suggested an action post suggestions to the MicMac blackboard, and the associated degrees of truth. The refusing agent(s) do the same, with the following results:

B.T→No-Action, 0%
B.AC→forward-Call, 10%
A→no-forward, 80%

The suggest forward-Call action has a value of 10%, while no-forward has a value of 80%. Thus, the arbitrator agent deduces that this action can not be allowed. The only other action is No-Action. The arbitrator agent realizes that no other action is permitted and therefore refuses the call request.

Turning now to the scenario of user A sending a Call-Request (CR) to user C. The device-agent of A (Agent A) posts the following Call-Request to the event-blackboard:

CR.caller=A, called=C.id=X2, noForward=80%

The device agent of C (Agent C) contains two sub-agents, a Termination-agent (C.T) and a Call-Forward-agent (C.CF). Agent C has the attribute available set to false. Agent C also contains the fuzzy variable forward-Call, which is set to 10% in order to allow the calls to be forwarded to C's secretary. Agent C also contains the following policy:

Pl_C1 O+ [on CR:CallRequest.called=C, caller=A] C {set (0.95)} forward-Call

This rule is set by Agent C to indicate that it is waiting for a call from A. When this call is received, the value of forward-Call is to 95% in order to express the preference of use C to forwarded this particular call to his secretary.

C.T contains the following policies:
Pl_CT1 O+ [on CR:CallRequest.called=C] C.T {accept-Call( )} CR [when (C.available=true)]
Pl_CT2 O+ [on CR:CallRequest.called=C]C.T {noAction( )} CR [when (C.available=false)]

C.CF contains the following policies:
Pl_CCF1 O+ [on CR:CallRequest.called=C] C.CF {noAction( )} CR[when (C.available=true)]
Pl_CCF2 O+ [on CR:CallRequest.called=C] C.CF {forwardCall( )} CR [when (C.available=false) AND (C.Forward-Call)]

When the call request is received from Agent A, Agent C sets the value of forward-Call to 95%. The two sub-agents of C suggest no-Action and forward-Call with a degree of truth of 95. Again, the system asks for the permission of the originator of this event, which is Agent A.

Agent A activates the rule Pl_A1 and refuses the call forward. A No-Permission-Exception event is generated again and the arbitrator agent opens a channel for the involved agents to start negotiating. The following rules are posted in this special purpose channel.

C.T→No-Action, 0%
C.CF→forward-Call, 95%
A→no-forward, 80%

The suggested forward-Call action has a value of 95%, while no-forward has a value of 80%. The arbitrator agent therefore overrides the objection of A and the call is forwarded to C's secretary.

The arbitrator is responsible for handling conflict between multiple agents. The following portion of this disclosure describes in detail how the arbitrator decides what to do in the scenario of FIG. 5.

Initially, the arbitrator receives the following tuple:
Event-Name: Exception
Event-Identifier: X3
Cause: No-Permission
From: A
Originating-Event:
Event-Name: Call-Forward
Event-Identifier: X2
By: B
To: Answer-Machine agent
Originating-Event:
Event-Name: Call-Request
Event-Identifier: X1
Parameters: {no-Forward: 80%}

Type: 1
From: A
To: B

In the event of a passive arbitrator being used, which applies equal weights for every agent involved in the exception, the arbitrator opens a separate channel and posts the events on it, starting with the oldest event (the inner event). Only the involved agents, A and B in this case, are allowed to reply to this event. The result of event X1 is that the termination agent of B suggests no-Action. The no-Action result is automatically assigned a degree of truth of 0%, to give it the lowest priority. The call forward agent of B suggests a forward-call with a degree of truth of 10%. The result of event X2 is that A refuses the forwarding of the call, with a degree of truth of 80%.

This gives rise to the following results:
B.T: no-Action 0%
B.AC: forward 10%
A: no-forward: 80%

The truth-value of the forward action is recalculated as equal to the original truth-value of the action, minus the truth-value of the permission refusal. Thus, forward=10%−80%=−70%. No-Action still equals 0%. The arbitrator therefore chooses No-Action, and the call request does not generate any further events. The sender of the call request interprets this as a refusal to his call.

If the same mechanism is applied for the second case, then:
C.T: no-Action 0%
C.CF: forward 95%
A: no-forward: 80%

The final truth-value of forward is =95%−80% =15%. No-Action still equals 0%. The arbitrator therefore chooses the action with the highest degree of truth (i.e. it will choose to forward the call).

It should be noted that an equal weight arbitrator is utilized. If a weighted-arbitrator had been used, the final truth-value of the action that didn't receive the permission would be equal to the truth-value of the action, multiplied by its weight, minus the truth-value of the denial multiplied by its weight.

Other embodiments and variations of the invention are possible. For instance, the examples and embodiments set forth herein relate to the field of telecommunications, and more particular to call processing within telephone systems. However, the principles of the invention may be applied to any multi-agent system which is susceptible to feature interaction conflicts (e.g. network resource management, costing systems, stock and bond trading systems, etc.). All such additional embodiments and applications are believed to be within the sphere and scope of the invention as defined by the claims appended hereto.

What is claimed is:

1. A method of handling call events in a communication system having multiple agents, comprising:
    assigning fuzzy parameters of various degrees of truth for defining user preferences to attributes of rules associated with responses of said agents to said call events;
    modifying said various degrees of truth based on intervening events; and
    resolving interaction conflict between said agents by selecting a response having the highest degree of truth, wherein said intervening events include state of said agents, and wherein said state includes busy is a busy state indicative of the agent communicating by a telephone device.

2. A method of handling call events in a communication system having multiple agents, comprising:
    assigning fuzzy parameters of various degrees of truth for defining user preferences to attributes of rules associated with responses of said agents to said call events;
    modifying said various degrees of truth based on intervening events; and
    resolving interaction conflict between said agents by selecting a response having the highest degree of truth, wherein said call events represent one of user actions, system actions or agent requests.

3. A method of handling call events in a communication system having multiple agents, comprising:
    assigning fuzzy parameters of various decrees of truth for defining user preferences to attributes of rules associated with responses of said agents to said call events;
    modifying said various degrees of truth based on intervening events; and
    resolving interaction conflict between said agents by selecting a response having the highest decree of truth, wherein said fuzzy parameters include an importance parameter that is indicative of the importance a user gives to a particular call.

* * * * *